United States Patent [19]

Murashige et al.

[11] 3,883,747

[45] May 13, 1975

[54] X-RAY INTENSIFYING SCREEN

[75] Inventors: Robert H. Murashige, Los Altos; Henry L. Myers, San Jose, both of Calif.

[73] Assignee: Minnesota Mining and Manufacturing Company, Saint Paul, Minn.

[22] Filed: Dec. 6, 1973

[21] Appl. No.: 422,280

[52] U.S. Cl. ............................ 250/483; 252/301.4 S
[51] Int. Cl. ............................................... H01j 1/62
[58] Field of Search ............... 250/483; 252/301.4 S

[56] References Cited
UNITED STATES PATENTS

| | | | |
|---|---|---|---|
| 3,738,856 | 6/1973 | Masi | 250/483 X |
| 3,783,298 | 1/1974 | Houston | 250/483 |

*Primary Examiner*—Archie R. Borchelt
*Attorney, Agent, or Firm*—Alexander, Sell, Steldt & DeLaHunt

[57] ABSTRACT

An X-ray intensifying screen having high radiographic acutance consisting essentially of a supported layer of a transparent binder having dispersed in it a phosphor and a dye which preferentially absorbs green light, the phosphor having the formula $[M_{1-x} Tb_x]_2 O_2S$ in which M is selected from the group consisting of gadolinium, lanthanum and yttrium and $x$ has a value in the range about 0.003 to 0.08.

4 Claims, No Drawings

X-RAY INTENSIFYING SCREEN

BACKGROUND OF THE INVENTION

Rare-earth X-ray intensifying screens are described in U.S. Pat. No. 3,725,704. These screens are similar to ordinary X-ray intensifying screens in that they convert X-rays into light rays which impinge on the film and so decrease the X-ray exposure required for diagnostic radiographic imaging. Rare-earth screens consisting of lanthanum oxysulfide, gadolinium oxysulfide or yttrium oxysulfide in which a small part of the lanthanum, gadolinium or yttrium has been replaced by terbium emit, when exposed to X-ray radiation, light in the blue to green portion of the spectrum but the major proportion of the emission occurs in the green portion (5,000 to 5,750 angstroms).

The X-ray intensifying screen is made up of a base support, a reflective layer, a phosphor layer and a protective overcoat. The phosphor particles are held in the phosphor layer by a transparent polymeric binder, such as a polymethacrylate, polycarbonate, cellulose acetate, cellulose acetate butyrate, polyvinyl butyral, a polyester, or mixtures of these polymers. When an X-ray activates a phosphor particle, the emission from the particle is isotropic, the emitted light travels from the particle in all directions, only a part of it moving in a direction toward the X-ray film. The portion of the emission directed away from the X-ray film has no effect on the image, but that part of the emission which moves in the direction of the X-ray film but not in a path perpendicular to the film is diffused and spread. The diffusion and spreading will be greater for emissions from phosphor particles located in the portion of the phosphor coating farthest away from the film. The portion of the emission which is diffused and spread as it passes through the phosphor layer in its path to the film causes a loss in acutance or sharpness of image, which is obviously undesirable.

DESCRIPTION OF THE INVENTION

It has been found that the loss of acutance caused by diffusion and spreading of the emitted light enroute to the film can be greatly decreased by incorporating a small amount of a dye which preferentially absorbs green light in the phosphor-binder mixture which constitutes the intensification screen. The longer the path of the light beam before it escapes the binder layer and reaches the film the greater will be the attenuation resulting from absorption of green light by the dye. The effect is a reduction in the amount of spread or diffused green light reaching the film and hence an improvement in image detail.

Illustrative dyes suitable for use in the invention are shown in Table 1.

Table 1

| Dye Name | Chemical Type | Maximum Absorption Peak |
| --- | --- | --- |
| Chrome Brilliant Violet 2R | Hydroxytriphenyl-methane | 5430A |
| Carbolan Violet 2R | Anthraquinone | 5470A |
| Duranol Violet 2R | Anthraquinone | 5490A |
| Supranol Brilliant Red 3B | Monoazo | 5480A |
| Brilliant Basic Red B | Azine | 5500A |
| Orasol Red B | Metallized Hydroxy Azo | 5300A |

It will be noted that the dyes above tabulated all have absorption peaks in the central part of the green range (4912–5750A). Lanthanum, gadolinium, and yttrium oxysulfides in which a small part of the lanthanum, gadolinium or yttrium has been replaced by terbium emit light which peaks rather sharply near 5440A when exposed to X-ray radiation. Dyes other than those listed in the table which exhibit absorption peaks in the generally central part of the green range may be used. The absorption characteristics of numerous dyes are shown in Synthetic Dyes in Biology, Medicine and Chemistry, Academic Press, London and N.Y. 1971 E. Gurr. In addition to having a high light absorption in the green range the dye should preferably have a minimal absorption in the 4,000 – 5,000 A area.

In addition to having the above described absorption characteristics the dyes should be readily and stably dispersible in the binder used in forming the screen. Compatibility of the dye with the binder is readily determined by simple mixing and inspection of the mixture when the binder has set. Because of the low level of dye concentration employed compatibility is rarely a problem, except with ionic and water-soluble dyes.

The quantity of green light absorbing dye must be limited if it is desired to prevent large reductions in the intensification factor provided by the intensification screen. In the event, however, that speed must be sacrificed to attain greater resolution or clarity of image the dye level can be taken up to 0.5 percent.

Table 1 shows the effect of increasing dye concentrations on the intensification factor. The data were obtained using $[La_{0.994}Tb_{0.006}]_2O_2S$ and $[Gd_{0.994}Tb_{0.006}]_2O_2S$ phosphors and which had respectively intensification factors of 8 and 6.7 before any dye was added.

Table 2

$[La_{0.994}Tb_{0.006}]_2O_2S$

| Green Absorbing Dye wt. % of Phosphor | Intensification Factor |
| --- | --- |
| none | 8 |
| 0.00035 | 7.9 |
| 0.00075 | 7.0 |
| 0.0018 | 5.7 |
| 0.0037 | 4.1 |
| 0.018 | 0.7 |

$[Gd_{0.994}Tb_{0.006}]_2O_2S$

| Green Absorbing Dye wt.% of Phosphor | Intensification Factor |
| --- | --- |
| none | 6.7 |
| 0.00035 | 6.0 |
| 0.00075 | 5.6 |
| 0.0018 | 4.7 |
| 0.0037 | 3.8 |
| 0.018 | 1.7 |
| 0.06 | 0.1 |

The term "intensification factor" as used herein means the speed factor over standard medium calcium tungstate and medium speed X-ray film. For example, an intensification factor 8 means that using the binder-film system having that factor the amount of X-ray radiation required to produce a given optical density with that screen film system is only one-eighth of that required to reach the same optical density with the calcium tungstate system. The absolute intensification factor is a function of screen thickness, phosphor efficiency, and reflective backing efficiency. The use of the above described type dyes in the phosphor-binder system of the present invention results in a loss in relative intensification factor value and a gain in image sharpness and resolution.

The following examples illustrate the effectiveness of the above described dyes in improving resolution.

EXAMPLE I

An X-ray intensifying screen formulation of polymethyl butyl methacrylate resin at 88 wt.% $[La_{1.994} Tb_{0.006}]_2 O_2S$ with Orasol Red B in amount equal to 0.001 percent of the phosphor weight compared to the X-ray intensifying screen without dye shows a decrease in intensification factor but an improvement in resolution by 3–4 groups.

|  | Intensification Factor | Resolution* |
|---|---|---|
| without dye | 8X | 5 l/mm |
| .001% dye | 4.5X | 7.1 l/mm |

*Resolution - lines per millimeter

EXAMPLE II

An X-ray intensifying screen formulation of polymethyl butyl methacrylate resin at 90 wt.% $[Gd_{1.99} Tb_{0.01}]_2 O_2S$ with Orasol Red B in amount equal to 0.0007% of phosphor weight compared to the X-ray intensifying screen without acutance dye shows a decrease in intensification factor but an improvement in resolution by 3–4 groups.

|  | Intensification Factor | Resolution |
|---|---|---|
| without dye | 8X | 6 l/mm |
| with .0007% dye | 4.5X | 9 l/mm |

EXAMPLE III

An X-ray intensifying screen formulation of polymethyl butyl methacrylate resin at 88 wt.% $[La_{1.992} Tb_{0.008}]O_2S$ with 0.002 percent Orasol Red B in amount equal to 0.002 percent of phosphor weight compared to the X-ray intensifying screen without acutance dye shows a decrease in intensification factor but an increase in resolution of 4–5 groups.

|  | Intensification Factor | Resolution |
|---|---|---|
| without dye | 8X | 5 l/mm |
| with .002% dye | 3.5X | 9 l/mm |

In the following example the adverse effect of using a dye which preferentially absorbs blue light is shown.

EXAMPLE IV

An X-ray intensifying screen formulation of polymethyl butyl methacrylate resin at 90 wt.% $[Gd_{1.99} Tb_{0.01}]_2 O_2S$ with Orasol Yellow GRLN in amount equal to 0.006 percent of the phosphor weight compared to the same X-ray intensifying screen without the dye shows a small decrease in intensification factor but a decrease in resolution of 1–2 groups.

|  | Intensification Factor | Resolution |
|---|---|---|
| without dye | 6X | 8 l/mm |
| with .006% dye | 4.8X | 6.3 l/mm |

Orasol Yellow GRLN has an absorption peak 4200–4300A and preferentially absorbs blue light.

The phosphors employed in the invention, i.e., $[M_{1-x} Tb_x]_2 O_2S$ preferably have a maximum value for $x$ about 0.04 because of the adverse effect of high terbium levels on sensitivity. In the case of the gadolinium phosphor the $x$ value is preferably held below 0.015 to preserve sensitivity and at a level at least 0.006 to suppress after-glow of the phosphor.

Intensifying screens made pursuant to this invention are conventional except for the composition of the phosphor-dye system. Conventional substrate, such as glass, aluminum, polyester film or the like is employed. The binder is a transparent polymer such as solid polymethacrylate, polycarbonate, cellulose acetate, cellulose acetate butyrate, polyvinyl butyral, polyesters, mixtures of two or more such polymers or copolymers to two or more of the precursor monomers. The phosphor is dispersed in the binder and coated on the substrate support in conventional manner.

We claim:

1. An X-ray intensification screen comprising a substrate support coated with dispersion of a phosphor having the formula $[M_{x-1} Tb_x]_2 O_2S$ wherein M is lanthanum, gadolinium or yttrium and x has a value in the range 0.003 to 0.08 and a dye preferentially absorbing green light in a transparent binder, the dye content being equal to from 0.0003 to 0.5 percent by weight of the contained phosphor.

2. An X-ray intensification screen as defined in claim 1 wherein the dye content of the dispersion is in the range 0.001 to 0.1 percent by weight of the contained phosphor.

3. An X-ray intensification screen as defined in claim 1 wherein M is gadolinium and $x$ is in the range 0.003 to 0.015.

4. An X-ray intensification screen as defined in claim 1 wherein M is gadolinium, $x$ is in the range 0.003 to 0.015 and the dye content is from 0.001 to 0.1 percent by weight of the contained phosphor.

* * * * *